3,331,822
PRODUCTION OF POLYTETRAFLUOROETHYLENE MOLDING POWDERS BY THE AQUEOUS SUSPENSION POLYMERIZATION OF TETRAFLUOROETHYLENE WITH SMALL AMOUNTS OF PERFLUOROOLEFINS CONTAINING FROM 3 TO 4 CARBON ATOMS

Yutaka Kometani, Hyogo, Masayoshi Tatemoto, Takatsuki-shi, Osaka, and Syozo Fumoto, Osaka, Japan, assignors, by mesne assignments, to Thiokol Chemical Corporation, Trenton, N.J., a corporation of Delaware
No Drawing. Filed Aug. 20, 1963, Ser. No. 303,404
7 Claims. (Cl. 260—87.5)

This invention relates to the production of polytetrafluoroethylene and, more particularly, to the production of polytetrafluoroethylene molding powders characterized by improved resistance to coalescence. The invention provides an improved process for producing polytetrafluoroethylene molding powders having high bulk density and excellent flow characteristics, as well as to the polytetrafluoroethylene molding powders which are produced by such process.

Polytetrafluoroethylene molding powders, which are generally produced by the suspension polymerization of tetrafluoroethylene in an aqueous medium containing a peroxide or persulfate (or similar) free radical catalyst system, are molded commercially by fabrication techniques which were adapted from powder metallurgy and in which the polytetrafluoroethylene molding powder is usually cold-pressed into a preform under high pressures and the preformed article then sintered at temperatures at or above the fusion temperature of the molding powder to produce the molded article. Because molded polytetrafluoroethylene articles produced by these powder molding techniques frequently possess low densities due to the occurrence of voids or cavities between the molded particles and consequently lack adequate tensile strength and structural rigidity, selection of suitable molding powders for these fabrication techniques is limited to those polytetrafluoroethylene molding powders which are relatively fine (20 to 300 mesh) and possess a high bulk density and sufficient powder fluidity to resist coalescence or agglomeration. Polytetrafluoroethylene molding powders which are coarser than 20 mesh generally yield molded articles which contain a large number of voids, while those which are finer than 300 mesh have a very poor powder fluidity and a low bulk density, both of which properties tend to characterize powders which agglomerate easily. Moreover, experience has shown that when the coarser polytetrafluoroethylene molding powders are compression molded, the internal cavities which are invariably present in the molded article tend to impart an uneven surface appearance to the molded article and to adversely affect its structural rigidity.

The flow characteristics, including the powder fluidity, of a polytetrafluoroethylene molding powder are related to the surface dimensions and to the surface properties of the powder. As a general rule, the surface of most polytetrafluoroethylene molding powders appears to resemble, under microscopic examination, that of a split feather which has a tendency towards agglomeration. In general, the finer the particles or the more fibrous-appearing they are, the greater the tendency of these polytetrafluoroethylene particles to agglomerate. Any tendency for a polytetrafluoroethylene molding powder to coalesce or agglomerate inherently affects the ease with which the powder may be charged to a mold which, in turn, affects the final properties of the molded article since there is very little, if any, shifting of the particles during subsequent sintering.

Using aqueous suspension polymerization techniques to prepare polytetrafluoroethylene molding powders, we have found that when the monomeric tetrafluoroethylene is copolymerized with from about 0.1 to about 10 percent by weight of a perfluoroolefin containing 3 to 4 carbon atoms, the resultant copolymer molding powders are substantially composed of spheroidal particles having a higher bulk density and improved flow characteristics over that obtained in molding powders of the homopolymer of tetrafluoroethylene. Poly(tetrafluoroethylene/perfluoroolefin) molding powders produced in accordance with the invention exhibit little tendency to coagulate and possess excellent powder fluidity. Because these copolymers contain only a relatively small amount of perfluoroolefin, they may be termed as and are herein called "polytetrafluoroethylene molding powders."

Accordingly, the invention contemplates the improvement in a process for the production of polytetrafluoroethylene molding powder by the aqueous suspension polymerization of tetrafluoroethylene, in which monomeric tetrafluoroethylene is polymerized by bringing the monomer into contact with an aqueous medium containing a free radical catalyst system, which comprises increasing the bulk density and enhancing the flow characteristics of the polymer by copolymerizing the monomeric tetrafluoroethylene with from about 0.1 to about 10 percent by weight of a perfluoroolefin containing from 3 to 4 carbon atoms through the addition of the perfluoroolefin to the aqueous polymerization medium, thereby producing a molding powder substantially composed of spheroidal particles having a high bulk density and characterized by improved resistance to coalescence.

Although many copolymers of tetrafluoroethylene and other perfluoroolefins have been prepared, only those copolymers containing a perfluoroolefin having 3 to 4 carbon atoms possess the increased bulk density and improved flow characteristics which characterize the polytetrafluoroethylene molding powders of the invention. For example, polytetrafluoroethylene molding powders prepared by copolymerizing tetrafluoroethylene with from about 0.1 to about 10 percent by weight of hexafluoropropene or perfluorocyclobutene, using a free radical catalyst system and aqueous suspension polymerization techniques, are substantially composed of spheroidal particles having a bulk density in the range from 0.5 to 0.7 gram per cubic centimeter and are characterized by improved resistance to coalescence. Only very small quantities of the perfluoroolefin are required to increase the bulk density and to enhance the flow characteristics of the polymer, for concentrations as low as 0.1 percent by weight (based on the total weight of the polymer) have been found to be effective. There is no particular advantage in using more than 10 percent by weight of the comonomeric perfluoroolefin, and in most instances concentrations in the range from 0.5 to 2 percent by weight are preferred. Interestingly, the same results in the increase in bulk density and in the improvement in flow characteristics of the resultant copolymer are obtained whether the perfluoroolefin is added at the beginning of the polymerization reaction or in smaller amounts during the course of the reaction.

Copolymerization of tetrafluoroethylene and a perfluoroolefin containing 3 to 4 carbon atoms to produce polytetrafluoroethylene molding powders in accordance with the invention requires standard suspension polymerization techniques, in which the monomers are introduced together or separately into an aqueous medium in which there is dissolved (or dispersed) a free radical catalyst system. Selection of a suitable free radical catalyst system is virtually a matter of choice, for any of the common polymerization catalysts may be used, such as persulfate salts, hydrogen peroxide, and organic peroxides and hydroperoxides, either alone or together with the necessary reducing agents, in which case the free radical catalyst system is a redox catalyst system. To obtain the proper degree of polymerization and to exert some degree of control over the reaction rate, the free radical catalyst system should be employed at concentrations in the range from about 0.0005 to about 0.01 (and preferably from about 0.001 to about 0.005) percent by weight, based on the weight of the aqueous polymerization medium.

As is common in aqueous suspension polymerization techniques, demineralized water should be employed as the suspension medium, using suitable reaction equipment. After deaeration of the demineralized water in which the redox catalyst system is dissolved, a small amount of the perfluoroolefin together with the tetrafluoroethylene are injected into the reactor, employing vigorous agitation to facilitate mass transfer and suspension polymerization. Because the polymerization reaction is heterogeneous, best results are obtained with reactors capable of effecting good gas-liquid-solid contact. Conventional polymerization reactors fitted with high speed agitators and baffles extending from the reactor walls have been found to be quite satisfactory.

Although the monomers may be liquified prior to injection into the aqueous polymerization medium, excellent polytetrafluoroethylene molding powders may be obtained by using gas phase polymerization in water-soluble free radical catalyst systems. Under these reaction conditions, the tetrafluoroethylene and perfluoroolefins are injected into the reactor at pressures in excess of 1 kg./cm.$^2$ guage, the reaction pressure generally varying between about 3 to about 50 kg./cm.$^2$ guage. The reaction pressure is maintained during the polymerization by adding make-up monomer. In general, the reaction should be carried out at a temperature in the range from about 10° C. to about 150° C., with the preferred temperature range being from about 10° C. to about 80° C., using water-to-polymer ratios greater than 1:1, and preferably in the range from 2:1 to 10:1. Under these conditions, the reaction rate is high and excellent yields of spheroidal particles having a high bulk density (from 0.5 to 0.7 gram per cubic centimeter) may be obtained.

The following examples are illustrative of the ease with which polytetrafluoroethylene molding powders having increased bulk density and excellent flow characteristics may be produced in accordance with the invention. In each of these examples, the bulk density was determined by placing 120 cc. of powder into a cylinder having a 20 mm. diameter and fitted with a shutter at its bottom. This cylinder was then placed above a second cylinder having a 40 mm. diameter and 30 mm. height, and the shutter of the first cylinder opened quickly to allow the powder to fall freely into the second cylinder. After removing excess powder by smoothing the top of the second cylinder with a ruler, the weight of the powder in the second cylinder was measured and the bulk density computed by dividing this weight by the volume.

*Example I*

One and one-half liters of demineralized water were added to a 3-liter autoclave equipped with a screw-type agitator, and the autoclave deaerated under vacuum. After complete deaeration of the water and evacuation of the autoclave, a gaseous mixture consisting of tetrafluoroethylene and 1 percent by weight of hexafluoropropene was injected into the autoclave at a pressure of 5 kg./cm.$^2$ guage, while maintaining the temperature of the aqueous polymerization medium at 60° C. The agitator was then started and 0.01 gram of ammonium persulfate added to the reaction medium. After the pressure in the autoclave started to decrease, tetrafluoroethylene (with 1 percent by weight of hexafluoropropene) was continuously injected into the autoclave to maintain a steady state reaction pressure.

When the reaction had proceeded for 3 hours, during which period 400 grams of tetrafluoroethylene had been consumed, the pressure was reduced and the polymerization reaction halted. The polymer was a milky white powder which was observed, under microscopic examination, to be composed substantially of spheroidal particles having an average particle size of 200 microns. The powder rapidly settled to the bottom of the aqueous polymerization medium and was easily recovered. After washing with distilled water and drying, the powder was found to have a bulk density of 0.6 gram per cubic centimeter and superior flow characteristics. This powder can be used to produce a uniformly smooth film of 2 mm. thickness on a thin substrate, and possessed excellent mechanical properties.

*Example II*

Using identical reaction conditions to those described in Example I, tetrafluoroethylene was copolymerized with 2.5 percent by weight of hexafluoropropene over a period of 4 hours, yielding 400 grams of a powder which was similar in appearance to the product obtained in Example I. Upon examination, the powder was found to be composed substantially of spheroidal particles having a bulky density of 0.7 grams per cubic centimeter.

*Example III*

Tetrafluoroethylene was copolymerized with 2.5 percent by weight of hexafluoropropene at a pressure of 10 kg./cm.$^2$ guage and a reaction temperature of 60° C., using 0.005 gram of ammonium persulfate as the catalyst and standard precautions in the aqueous suspension polymerization. The polymer was a milky white powder composed substantially of spheroidal particles having a bulk density of 0.6 gram per cubic centimeter and excellent flow properties.

*Example IV*

Using the aqueous suspension polymerization techniques described in Example I, tetrafluoroethylene was copolymerized with 2.5 percent by weight of hexafluoropropene. After each 100 grams of polymers was produced, additional hexafluoropropene was added to the autoclave to maintain the same ratio. The polytetrafluoroethylene molding powder produced during the reaction had excellent flow properties and a bulk density of 0.6 gram per cubic centimeter.

Although the foregoing examples have demonstrated the advantages which are obtained when polytertafluoroethylene molding powders are produced by the aqueous suspension polymerization of tetrafluoroethylene and small amounts of hexafluoropropene, similar results are obtained by using other perfluoroolefins containing 3 to 4 carbon atoms as the comonomer.

We claim:

1. In a process for the production of polytetrafluoroethylene molding powder by the aqueous suspension polymerization of tetrafluoroethylene, in which monomeric tetrafluoroethylene is polymerized by bringing the monomer into contact with an aqueous medium containing a free radical catalyst system, the improvement which consists essentially of increasing the bulk density and enhancing the flow characteristics of the polymer by copolymerizing the monomeric tetrafluoroethylene with from 0.5 to 2 percent by weight of a perfluoroolefin containing from 3 to 4 carbon atoms through the addition of the perfluoroolefin to the aqueous suspension polymerization medium, thereby producing a molding powder substantially composed of spheroidal particles having a bulk density in the range from 0.5 to 0.7 gram per cubic centimeter and characterized by improved resistance to coalescence.

2. In a process for the production of polytetrafluoroethylene molding powder by the aqueous suspension polymerization of tertafluoroethylene, in which monomeric tetrafluoroethylene is polymerized by bringing the monomer into contact with an aqueous medium containing a free radical catalyst system, the improvement which consists essentially of increasing the bulk density and enhancing the flow characteristics of the polymer by copolymerizing the monomeric tetrafluoroethylene with from 0.5 to 2 percent by weight of a perfluoroolefin selected from the group consisting of hexafluoropropene and perfluorocyclobutene through the addition of the perfluoroolefin to the aqueous suspension polymerization medium, thereby producing a molding powder substantially composed of spheroidal particles having a bulk density in the range of from 0.5 to 0.7 gram per cubic centimeter and characterized by improved resistance to coalescence.

3. In a process for the production of polytertafluoroethylene molding powder by the aqueous suspension polymerization of tetrafluoroethylene, in which monomeric tetrafluoroethylene is polymerized by bringing the monomer into contact with an aqueous medium containing a free radical catalyst system at a temperature in the range from about 10° C. to about 80° C., the improvement which consists essentially of increasing the bulk density and enhancing the flow characteristics of the polymer by copolymerizing the monomeric tetrafluoroethylene with from 0.5 to 2 percent by weight of hexafluoropropene through the addition of the hexafluoropropene to the aqueous suspension polymerization medium, thereby producing a molding powder substantially composed of spheroidal particles having a bulk density in the range from 0.5 to 0.7 gram per cubic centimeter and characterized by improved resistance to coalescence.

4. Polytetrafluoroethylene molding powder characterized by improved resistance to coalescence and consisting essentially of substantially spheroidal particles of a copolymer prepared by the aqueous suspension polymerization of tetrafluoroethylene and from about 0.5 to about 2 percent by weight of a perfluoroolefin containing from 3 to 4 carbon atoms, and having a bulk density in the range from 0.5 to 0.7 gram per cubic centimeter.

5. Polytetrafluoroethylene molding powder characterized by improved resistance to coalescence and consisting essentially of substantially spheroidal particles of a copolymer prepared by the aqueous suspension polymerization of tetrafluoroethylene and from 0.5 to 2 percent by weight of a perfluoroolefin selected from the group consisting of hexafluoropropene and perfluorocyclobutene, and having a bulk density in the range from 0.5 to 0.7 gram per cubic centimeter.

6. Polytetrafluoroethylene molding powder characterized by improved resistance to coalescence and consisting essentially of substantially spheroidal particles of a copolymer prepared by the aqueous suspension polymerization of tetrafluoroethylene and from 0.5 to 2 percent by weight of hexafluoropropene, and having a bulk density in the range from 0.5 to 0.7 gram per cubic centimeter.

7. Polytetrafluoroethylene molding powder characterized by improved resistance to coalescence and consisting essentially of substantially spheroidal particles of a copolymer prepared by the aqueous suspension polymerization of tetrafluoroethylene and from 0.5 to 2 percent by weight of hexafluoropropene, and having an average particle size of 200 microns and a bulk density in the range from 0.5 to 0.7 gram per cubic centimeter.

References Cited
UNITED STATES PATENTS

| | | | |
|---|---|---|---|
| 2,773,781 | 12/1956 | Rodman | 260—92.1 XR |
| 2,946,763 | 7/1960 | Bro et al. | 260—87.5 |
| 3,142,665 | 7/1964 | Cardinal et al. | 260—92.1 |

ALEX MAZEL, *Primary Examiner.*

JOSEPH L. SCHOFER, *Examiner.*

M. L. BERCH, J. A. DONAHUE, *Assistant Examiners.*